United States Patent [19]

Brunet et al.

[11] Patent Number: 4,745,313
[45] Date of Patent: May 17, 1988

[54] STATOR HAVING THREE-PHASE SUPERCONDUCTING WINDINGS

[75] Inventors: Yves Brunet, Gieres; Pascal Tixador, Grenoble, both of France

[73] Assignee: Alsthom, Paris, France

[21] Appl. No.: 1,079

[22] Filed: Jan. 7, 1987

[30] Foreign Application Priority Data

Jan. 8, 1986 [FR] France .................. 86 00181

[51] Int. Cl.$^4$ .............................. H02K 9/00
[52] U.S. Cl. ...................... 310/52; 310/64; 310/254
[58] Field of Search ............... 310/10, 52, 58, 59, 310/64, 40 R, 71, 254, 165, 180, 184, 43, 45; 62/505; 174/15 CA, 126 S

[56] References Cited

U.S. PATENT DOCUMENTS

| 3,405,290 | 10/1968 | Halas | 310/10 |
|---|---|---|---|
| 3,441,755 | 4/1969 | Grunwald | 310/10 |
| 3,940,643 | 2/1976 | Sika | 310/52 |
| 4,058,746 | 11/1977 | Mole | 310/10 |
| 4,058,747 | 11/1977 | Mailfert | 310/52 |

FOREIGN PATENT DOCUMENTS 148348 8/1985 Japan .
2123219 1/1984 United Kingdom .

Primary Examiner—R. Skudy
Attorney, Agent, or Firm—Sughrue, Mion, Zinn, Macpeak, and Seas

[57] ABSTRACT

An electric machine stator (6) having superconducting three-phase windings, the stator comprising tubular elements (7, 8) and end plates (9, 10) forming a cryogenic enclosure containing a bath of liquid helium at very low temperature, with the windings being disposed in said bath, an additional tubular element (11) supporting said enclosure at one of its ends and fixed at its other end in sealed manner to an additional end plate (3), annular screens (13, 14) for reflecting radial thermal radiation, and current leads to the windings, the stator including the improvements whereby the tubular elements and the end plates forming the enclosure, the tubular element supporting the enclosure, and the annular screens for reflecting radial thermal radiation are based on a material which does not conduct electricity, and whereby the annular screens for reflecting radial thermal radiation are covered with layers (41, 43) of metal wires of high thermal conductivity, each of which layers has at least one point thereof put into heat conducting connection with a heat exchanger having a chamber (16) through which flows gaseous helium evacuated from the enclosure passing therethrough.

12 Claims, 6 Drawing Sheets

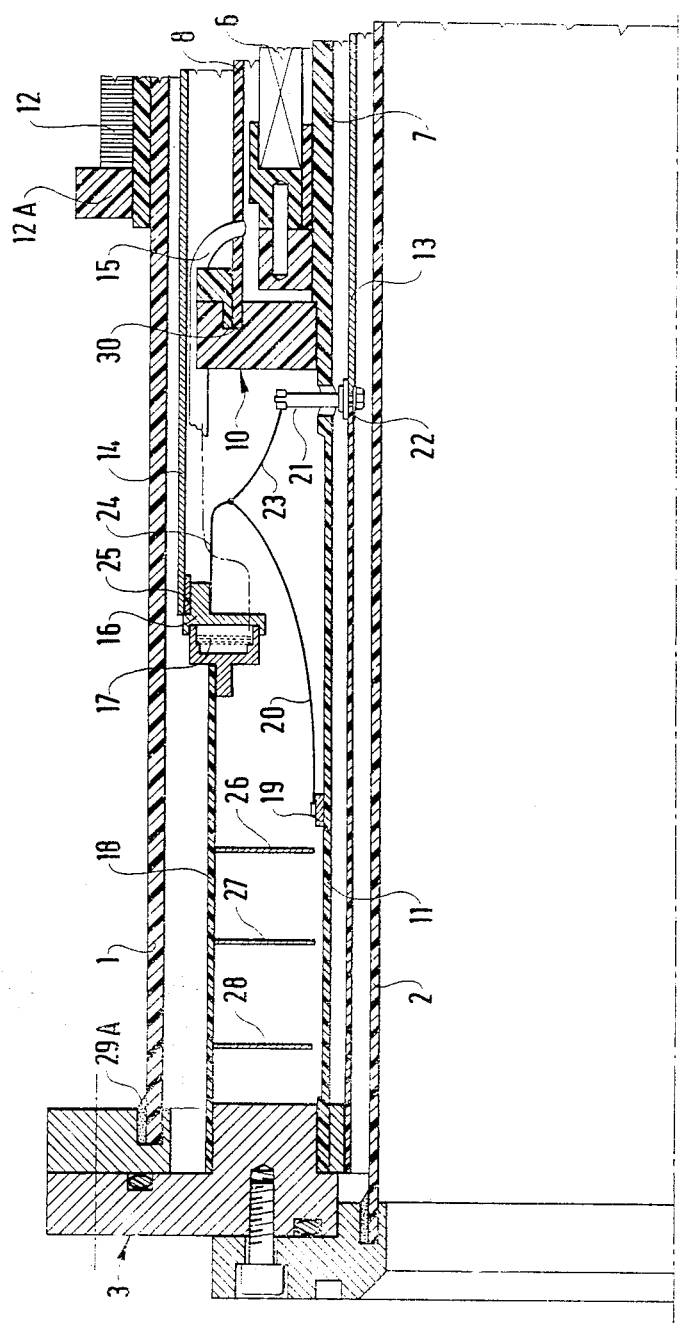

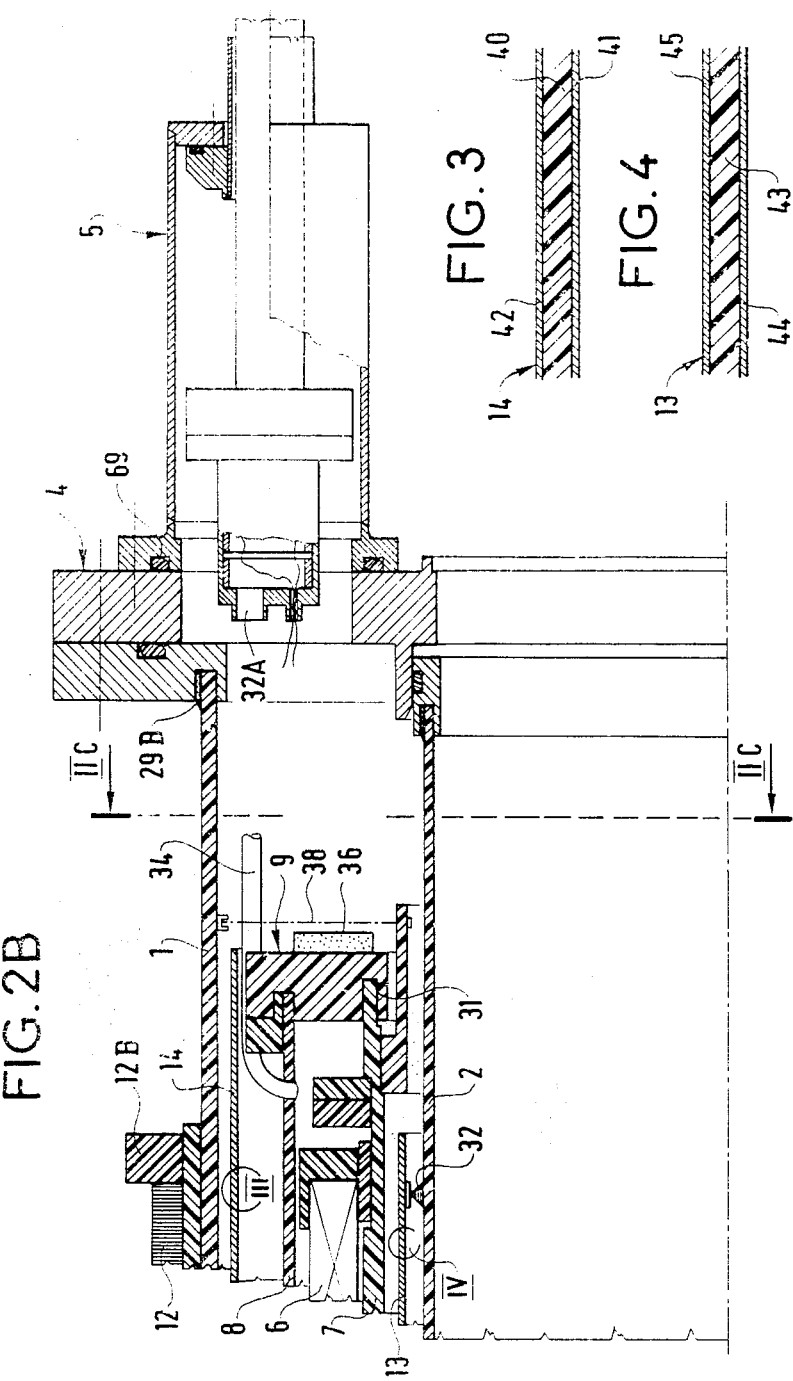

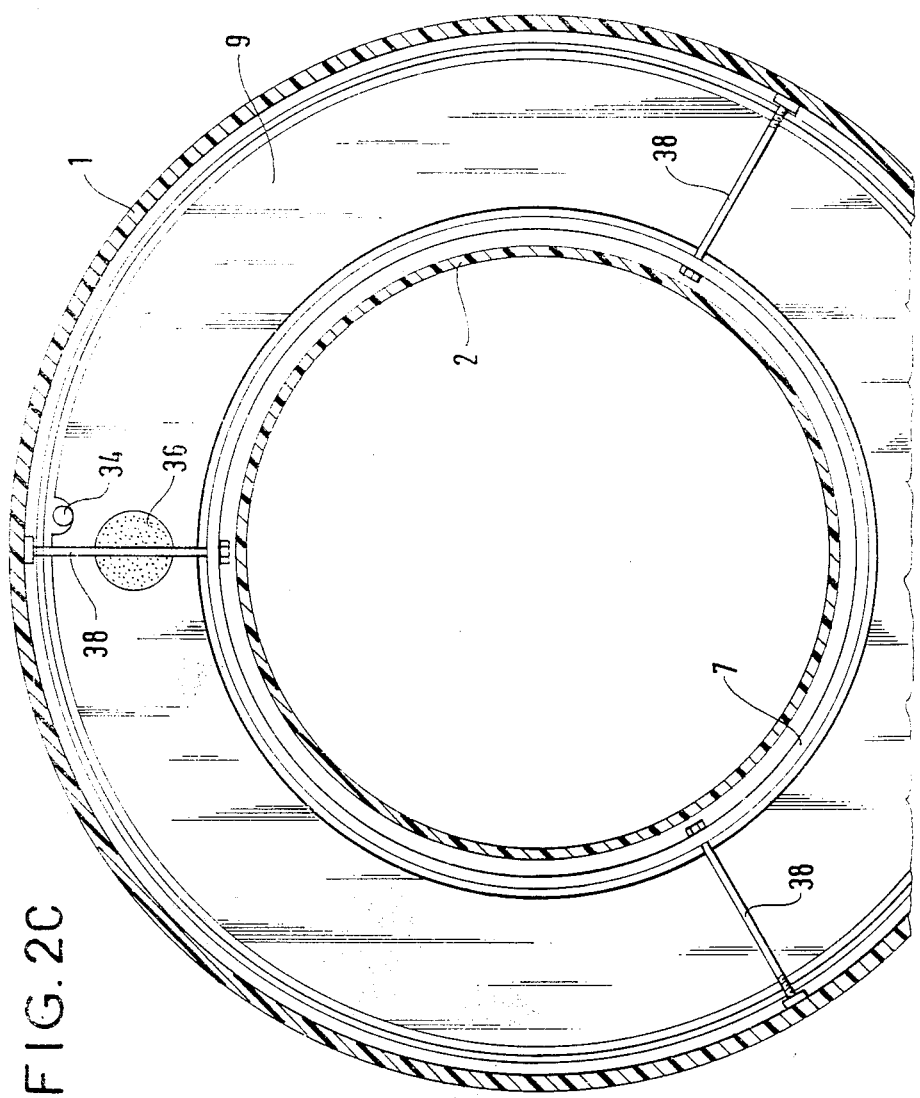

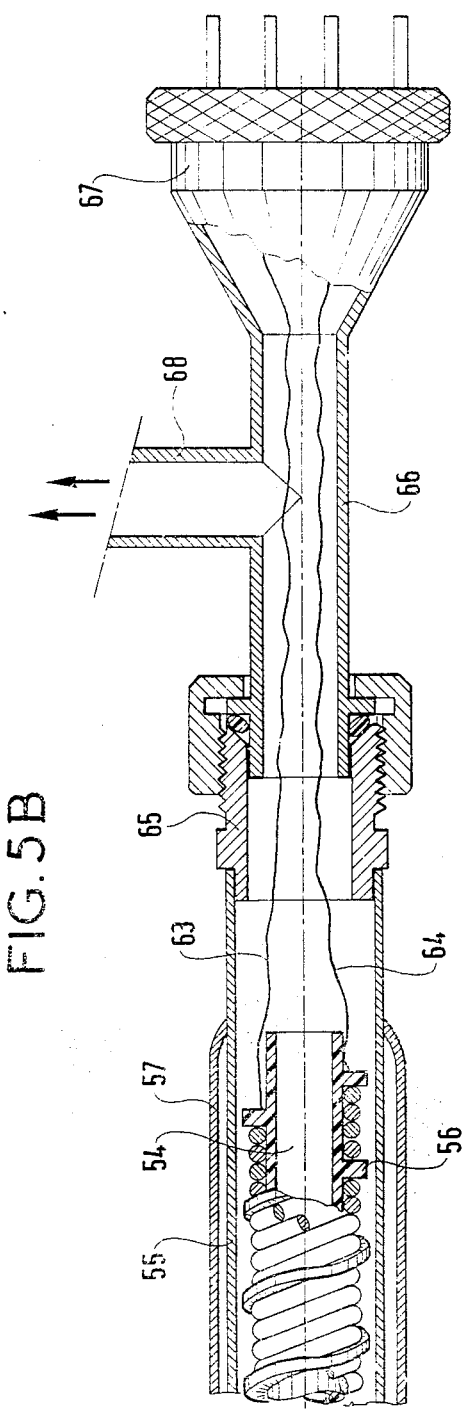

STATOR HAVING THREE-PHASE SUPERCONDUCTING WINDINGS

The present invention relates to an electric machine stator having superconducting three-phase windings, the stator comprising tubular elements and end plates forming a cryogenic enclosure containing a bath of liquid helium at very low temperature, with the windings being disposed in said bath, an additional tubular element supporting said enclosure at one of its ends and fixed at its other end in sealed manner to an additional end plate, annular screens for reflecting radial thermal radiation, and current leads to the windings.

BACKGROUND OF THE INVENTION

Prior proposals have been made to constitute the tubular elements and the end plates forming the enclosure containing the superconducting windings, together with the tubular element supporting said enclosure and the annular screens from non-magnetic metal such as austenitic steels, and in particular those referred to under the designations A 286 and A 316 LN. However, such steels suffer from non-negligible eddy current losses, thereby giving rise to heat losses and increased energy consumption for cooling the superconducting windings by means of a helium cycle.

It might be thought that the above-mentioned non-magnetic metals could be replaced by glass fiber and resin composite materials having very low electrical and thermal conductivity, with the screens for reflecting radial thermal radiation being coated with thin polished metal leaf for reflecting the radiation, however, by virtue of the poor thermal conductivity of glass fiber and resin composite materials, the screens remain at too high a relative temperature and give rise to radiation losses from the tubular element supporting the enclosure or from the annular screens towards the enclosure containing the windings.

The aim of the present invention is to provide a stator having three-phase superconducting windings with low losses due to heat conduction and to eddy currents, and in which the tubular element supporting the enclosure containing the windings and the external radiation reflecting screens remain at a very low temperature so that they do not give rise to large heat losses by virtue of their own radiation into the enclosure containing the windings.

SUMMARY OF THE INVENTION

The present invention provides an electric machine stator having superconducting three-phase windings, the stator comprising tubular elements and end plates forming a cryogenic enclosure containing a bath of liquid helium at very low temperature, with the windings being disposed in said bath, an additional tubular element supporting said enclosure at one of its ends and fixed at its other end in sealed manner to an additional end plate, annular screens for reflecting radial thermal radiation, and current leads to the windings, the stator including the improvements whereby the tubular elements and the end plates forming the enclosure, the tubular element supporting the enclosure, and the annular screens for reflecting radial thermal radiation are based on a material which does not conduct electricity, and whereby the annular screens for reflecting radial thermal radiation are covered with layers of metal wires of high thermal conductivity, each of which layers has at least one point thereof put into heat conducting connection with a heat exchanger having a chamber with a flow of gaseous helium evacuated from the enclosure passing therethrough.

The present invention preferably includes at least one of the following features:

The heat conducting connection between a point of the encloure-supporting tubular element or a point on the inner annular screen for reflecting radial thermal radiation and the heat exchanger is constituted by a braid of wires made of a metal which is a good conductor of heat.

The heat conducting connection between a point on the outer annular screen for reflecting radial thermal radiation and the heat exchanger is constituted by a metal junction member located between one end of said screen and the wall of the chamber through which there is a flow of gaseous helium evacuated from the cryogenic enclosure.

The heat exchanger comprises a ring of sintered conductive metal disposed in the chamber through which the gaseous helium evacuated from the enclosure is made to flow.

The enclosure is supported at its end opposite to the end which is connected to the tubular supporting element by means of rods of stainless steel, preferably in three groups at 120° intervals, which rods are fixed to the cylinder which forms the outermost envelope. This reduces mechanical vibrations.

The stator is connected to its current leads by means of a box through which very low temperature helium flows, said box being provided with disks of sintered conductive metal having passages passing therethrough for the current leads.

The current leads are made of a normally conductive metal, and they are wound around a helically machined tube which is contained in a coaxial outer tube of slightly larger diameter than the outer diameter of the machined tube, thereby delimiting a helical outlet path for the very low temperature helium which is in contact with the current leads.

BRIEF DESCRIPTION OF THE DRAWINGS

An alternator stator having three-phase superconducting windings in accordance with the invention is described below by way of example with reference to the accompanying drawings, in which:

FIG. 2A is a section of zone A in FIG. 1 shown to a larger scale;

FIG. 2B is a section of zone B of FIG. 1 shown to a larger scale;

FIG. 2c is a transverse sectional view through zone A of the stator of FIG. 1, to a larger scale.

FIG. 3 shows a detail III of FIG. 2B on an even larger scale;

FIG. 4 shows a detail IV of FIG. 2B on the same even larger scale;

FIG. 5B shows the right-hand end of the current-lead device to the same scale as FIG. 5A.

MORE DETAILED DESCRIPTION

Figure 1:
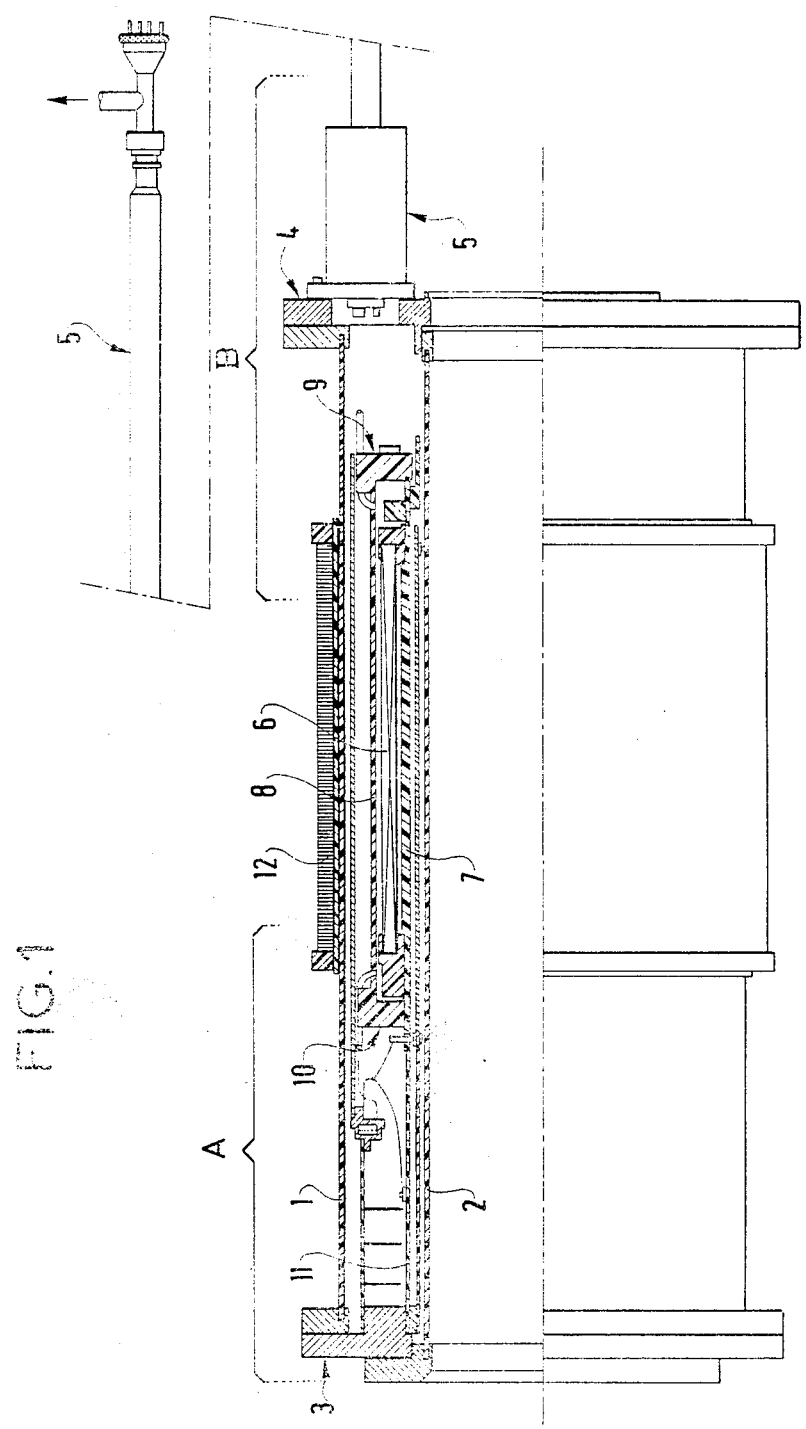
FIG. 1 is an overall side view of the stator shown partially in section.

In FIG. 1, the stator is contained between coaxial cylindrical enclosures 1 and 2 made of glass fiber and epoxy resin composite material and clamped at their ends in end plates 3 and 4. The end plates are located outside the variable magnetic field and may therefore be made of metal. The current-lead member 5 is disposed to the right of the figure and is connected to the right-hand end plate 4. The superconducting windings 6 are disposed in an enclosure delimited by tubes 7 and 8, both of which are made of glass fiber and epoxy resin composite material, and which are clamped between end plates 9 and 10 also made of composite material. The outer tube 8 and the right-hand end plate 9 are removable, thereby providing easy access to the windings 6. The enclosure containing the windings is supported on the left-hand side of the figure by a tube 11 made of glass fiber and epoxy resin composite, and to the right-hand side of the figure it is supported by three groups of stainless steel rods 38 at 120° intervals and fixed to the outermost cylinder 1 (shown more clearly in FIGS. 2B and 2C).

In order to prevent any magnetic disturbance escaping from the machine, a magnetic sleeve 12 held between end rings 12A and 12B serves to provide a low reluctance magnetic flux path.

FIG. 2A shows greater detail of the device for holding a point of the supporting tube at low temperature in such a manner as to reduce heat losses by axial conduction along a solid, together with thermal screens for reducing heat losses by radial radiation.

The thermal screens are in thermal connection with a heat exchanger 16 having a chamber containing a sintered metal ring 17 with cold helium gas flowing therethrough, said gas coming from the enclosure containing the superconducting windings 6, through duct 34 and removed therefrom via duct 15. In this heat exchanger, cold helium passes through said sintered metal ring 17, made of sintered copper beads, for example, and in thermal connection with the periphery of the heat exchanger 16, and is then removed via said duct 15. This heat exchanger is fixed at one end of an envelope 18 made of glass fiber and epoxy resin composite material. Outside the area containing a variable magnetic field, the envelope 18 supports copper rings 26, 27, and 28 having "superinsulation" (not shown) disposed thereon in the form of alternating sheets of polished aluminum and glass fiber net, with the set of copper rings and superinsulation coverings applied thereto serving to reduce heat losses by axially-directed radiation. In addition, the envelope 18 is covered with superinsulation in order to reduce heat losses by radial radiation.

The thermal screen 14 (as shown on a larger scale in FIG. 3) comprises a support 40 made of glass fiber and epoxy resin composite having a layer of copper wires 41 bonded to its inside face. This layer is maintained at the temperature of the heat exchange 16 by conduction. The copper wires are of sufficiently small diameter to limit eddy current losses, but of sufficiently large diameter to provide good axial heat conduction. Their diameter may lie in the range 0.5 mm to 0.8 mm, for example. The copper wire surfaces are polished in order to improve their emissivity. The outer surface of the screen 14 has strips of polished aluminum 42 glued thereto, and thermal contact with the heat exchanger 16 is provided by a metal junction member 25.

Similarly, the thermal screen 13 disposed on the inside of the winding enclosure is constituted (as shown to a larger scale in FIG. 4) by a support 43 made of a glass fiber and epoxy resin composite, with a layer 44 of copper wires bonded to its outer surface. The inner surface of this screen has strips of polished aluminum 45 glued thereto.

This screen 13 is supported by the end plate 3 and by the innermost tube 2 by means of wedges 32 of low thermal conductivity (see FIG. 2B).

The supporting tube 11 has the same structure.

The screen 13 and the supporting tube 11 are maintained at the low temperature of the heat exchanger 16 by means of copper braids 20, 23, and 24. The braid 20 is fixed to the tube 11 in good thermal contact with its layer of copper wires at a point 19, while the braid 23 is fixed to a peg 21 which is in turn fixed at a point 22 in good thermal contact with the layer of copper wires on the screen 13. The braids 20 and 23 are both connected to the braid 24 which is in turn connected at one end to the outside surface of the heat exchanger 16.

The connections between the metal end plates and the tube of glass fiber and epoxy resin composite, for example the connections 29A and 29B between the tube 1 and end plates 3 and 4 (see FIGS. 2A and 2B) are provided by means of a cyanoacrylic glue sold under the name trademark "STYCAST" by Emerson Cumming Co.

Sealing is provided by means of silicone gaskets which are impervious to low temperature helium, gaskets by the French Company Rhone—Poulenc, e.g. the gaskets 30 on the end plate 10 and 31 on the end plate 9. These connections which are sealed but which are capable of being disassembled may be held together by metal nut and bolt systems of as small a volume as possible in order to limit the eddy currents that are induced therein.

The vacuum inside the cryostat of about $10^{-3}$ pascals, and improved by cryopumping, is maintained over a period of time by means of a cartridge 36 of active carbon.

Figure 5A:
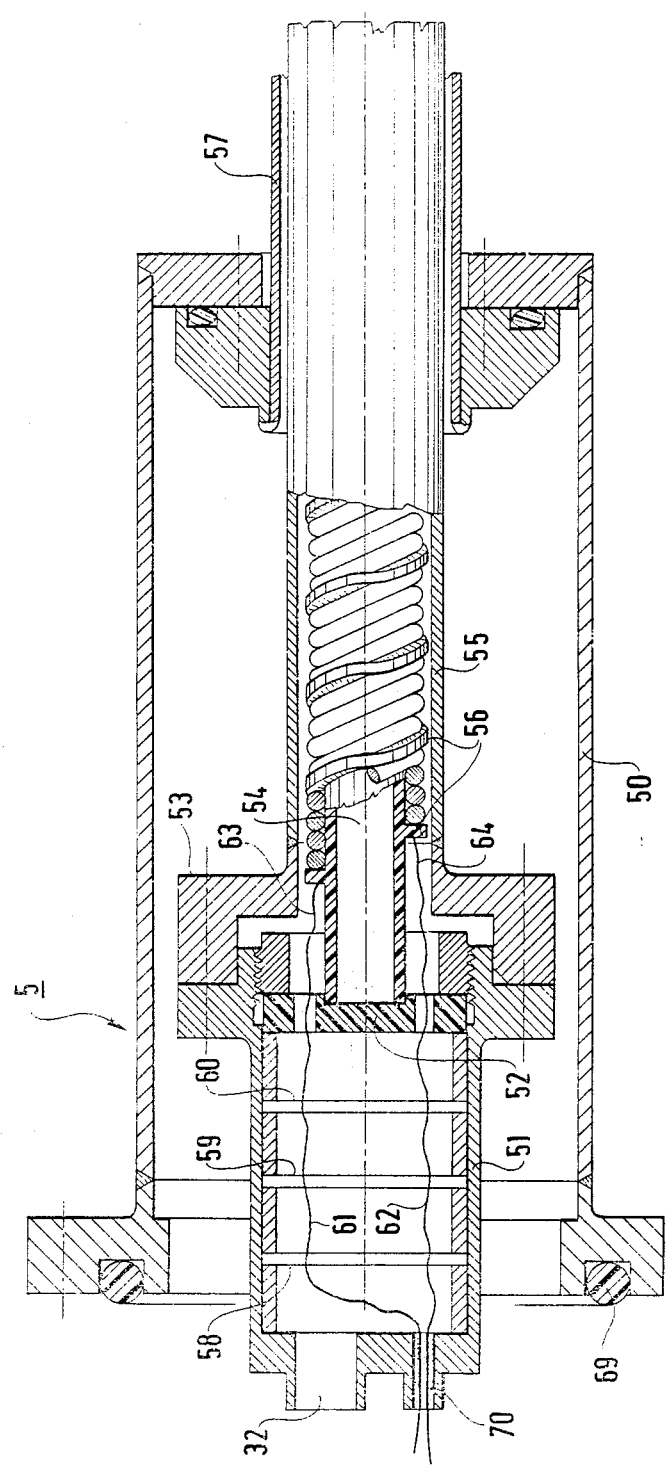
FIG. 5A shows the left-hand portion of the current-lead device to an enlarged scale.

The current leads are shown in FIGS. 5A and 5B. In this example, they comprise four wires (for a star-connected three-phase winding having a neutral outlet), as shown by the four-lead connection 67 (FIG. 5B). A connection box 50 is capable of being connected either to a cryogenic line or else to a conventional copper line. The connection box 50 is cooled by helium vapor coming directly from the cryogenic enclosure via a pipe 32A.

The superconducting wires from the windings are connected therein either to superconducting wires or else to copper wires. In the example shown, the outlet wires are made of copper. The superconducting wires such as 61 and 62 pass through a sealed junction 70 made of "STYCAST" cyanoacrylic glue, then pass through the box 51, going through disks of sintered copper 58, 59, and 70 for keeping them at low temperature, then pass through a screw stopper 52 before reaching copper wires such as 63 and 64 coming from the tube 55 which is terminated by an end fitting 53 fixed in sealed manner to the end of box 51.

The copper wires are wound around a tube 54 whose outer surface is helically machined and which is disposed inside the tube 55. The helical wall 56 thus obliges helium vapor introduced into tube 55 through opening 32A is sintered copper disks 58, 59, 60 and screw stopper 52, to follow a helical path in contact with the conductors, thereby cooling them effectively. The tube 55 is itself contained beyond the box 50 and up to its hot end inside a coaxial tube 57 which is connected to the chamber inside said box.

At its hot end, the tube 55 is terminated by an end fitting 65 screwed into the end of a link 66 which terminates with the electrical connection 67 and which includes a side tube 68 for removing helium after it has been heated by coming into contact with the conductors.

At its cold end, the connection box is provided with an annular gasket 69 for sealing its connection with the right-hand end plate 4 of the stator outer enclosure.

It will be understood that the stator is also provided with a liquid helium supply duct (not shown) which is removably connected to the supply by means of a Johnston connection, together with auxiliary outlets for evaporated helium and measuring wire.

We claim:

1. In an electric machine stator including superconducting three-phase windings, said stator comprising tubular elements and end plates forming a cryogenic enclosure containing a bath of liquid helium at very low temperature, said windings being disposed in said bath, an additional tubular element supporting said enclosure at one of its ends and fixed, at its other end, in a sealed manner to an additional end plate, annular screens for reflecting radial thermal radiation, and current least to the windings, the improvement wherein the tubular element and the end plates forming the enclosure, and the annular screens for reflecting radial thermal radiation are formed of a material which does not conduct electricity, and wherein the annular screens for reflecting radial thermal radiation are covered with layers of metal wires of high thermal conductivity, each of which layers having at least one point thereof forming a heat conducting connection with a heat exchanger having a chamber and means for passing a flow of gaseous helium evacuated from the enclosure through said heat exchanger chamber.

2. A stator according to claim 1, wherein the tubular element for supporting the enclosure and the annular screens for reflecting radial thermal radiation are made of a glass fiber and resin composite material.

3. A stator according to claim 1, wherein the heat conducting connection between a point of an inner annular screen for reflecting radial thermal radiation and the heat exchanger having the gaseous helium flow chamber is constituted by a braid of wires made of a metal which is a good conductor of heat.

4. A stator according to claim 1, wherein the heat conducting connection between a point on the outer annular screen for reflecting radial thermal radiation and the heat exchanger having a chamber with a flow of gaseous helium is constituted by a metal junction member.

5. A stator according to claim 1, further including a braid of wires made of a metal which is a good conductor of heat providing a thermal connection between a point on the additional tubular element for supporting the enclosure and the heat exchanger having a chamber with the flow of gaseous helium.

6. A stator according to claim 1, wherein the heat exchanger comprises a ring of sintered conductive metal disposed in the heat exchanger chamber through which the gaseous helium evacuated from the enclosure is made to flow.

7. A stator according to claim 1, wherein the enclosure is supported at its end opposite to the end which is connected to the tubular supporting element by means of rods of stainless steel which are fixed to the cylinder which forms the outermost envelope.

8. A stator according to claim 7, wherein the rods of stainless steel are in three groups of rods disposed at 120° intervals.

9. A stator according to claim 1, further including a box connected to the current leads through which very low temperature helium flows, and said box being provided with disks of sintered conductive metal having passages passing therethrough for the current leads.

10. A stator according to claim 1, wherein the current leads are made of a normally conductive metal and said current leads are wound around a helically machined tube having a helical wall which tube is contained in a coaxial outer tube of slightly larger diameter than the outer diameter of the machined tube, and wherein said helical wall delimits a helical outlet path for the very low temperature helium which is in contact with the current leads.

11. A stator according to claim 1, wherein the current leads are made of a metal exhibiting normal conductivity.

12. A stator according to claim 1, wherein the current leads are made of a superconducting material.

* * * * *